United States Patent
Tu et al.

(10) Patent No.: US 12,369,137 B2
(45) Date of Patent: Jul. 22, 2025

(54) BASE STATION DETERMINATION METHOD, APPARATUS AND DEVICE, AND COMPUTER STORAGE MEDIUM

(71) Applicants: CHINA MOBILE SHANGHAI ICT CO., LTD., Shanghai (CN); CM INTELLIGENT MOBILITY, Shanghai (CN); CHINA MOBILE COMMUNICATIONS GROUP CO., LTD., Beijing (CN)

(72) Inventors: Kui Tu, Shanghai (CN); Yuxin Wang, Shanghai (CN); Kaiyue Ni, Shanghai (CN)

(73) Assignees: CHINA MOBILE SHANGHAI ICT CO., LTD., Shanghai (CN); CM INTELLIGENT MOBILITY, Shanghai (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 425 days.

(21) Appl. No.: 18/003,315

(22) PCT Filed: Apr. 8, 2021

(86) PCT No.: PCT/CN2021/085951
§ 371 (c)(1),
(2) Date: Dec. 25, 2022

(87) PCT Pub. No.: WO2022/033056
PCT Pub. Date: Feb. 17, 2022

(65) Prior Publication Data
US 2023/0254807 A1  Aug. 10, 2023

(30) Foreign Application Priority Data
Aug. 14, 2020 (CN) .......................... 202010819525.3

(51) Int. Cl.
*H04W 64/00* (2009.01)

(52) U.S. Cl.
CPC ................. *H04W 64/003* (2013.01)

(58) Field of Classification Search
CPC ... H04W 64/003; H04W 16/18; H04W 4/029; H04W 64/00; H04W 4/40; H04W 72/25;
(Continued)

(56) References Cited

U.S. PATENT DOCUMENTS 5,477,458 A * 12/1995 Loomis ................. G01S 19/071
342/463
6,208,289 B1  3/2001 Haendel
(Continued)

FOREIGN PATENT DOCUMENTS

| CN | 105334524 A | 2/2016 |
| CN | 105549055 A | 5/2016 |

(Continued)

OTHER PUBLICATIONS

International Search Report in the international application No. PCT/CN2021/085951, mailed on Jun. 25, 2021.
(Continued)

*Primary Examiner* — Nimesh Patel
(74) *Attorney, Agent, or Firm* — SYNCODA LLC; Feng Ma

(57) ABSTRACT

A base station determination method includes: acquiring differential positioning information of at least one base station; according to a received satellite positioning signal and at least one group of differential positioning information, respectively calculating a calculation position of a roadside device corresponding to the at least one group of differential positioning information; and determining a target base station from the at least one base station according to the calculation position of the roadside device and the
(Continued)

actual position of the roadside device. The target base station is a base station that corresponds to differential positioning information corresponding to a calculation position, the distance between which and the actual position is the least.

15 Claims, 4 Drawing Sheets

(58) Field of Classification Search
CPC ......... H04W 4/44; H04W 88/06; H04W 8/26; H04W 4/023; H04W 4/024; H04W 52/0206; H04W 60/06; H04W 72/51; H04W 72/52; H04W 8/12; G01S 19/41; G01S 19/073; G01S 2205/01; G01S 19/42; G01S 19/071; G01S 5/011; G01S 5/009; G01S 19/03; G01S 1/02; G01S 13/86; G01S 17/86; G01S 19/12; G01S 19/45; G01S 5/0063; G01S 2205/002; G01S 13/867; G01S 17/06; G01S 5/01; G01S 5/0244; Y02D 30/70; H04B 7/18517; G05D 1/0278; G05D 1/0295; G05D 1/0061; G05D 1/024; G05D 1/0246; G05D 1/027; G08G 1/161; G08G 1/164; G08G 1/22; G08G 1/096783; G08G 1/0116; G08G 1/0141; G08G 1/017; G08G 1/0112; G08G 1/096725; G08G 1/09623; G08G 1/096708; G08G 1/091; G08G 1/127; G08G 1/137; G08G 1/20; H04L 5/0053; H04L 27/2602

See application file for complete search history.

(56) References Cited

U.S. PATENT DOCUMENTS

| | | | |
|---|---|---|---|
| 10,332,395 B1* | 6/2019 | Berg | G01S 19/41 |
| 2005/0110676 A1* | 5/2005 | Heppe | G01S 19/04 |
| | | | 342/357.34 |
| 2016/0327650 A1* | 11/2016 | Barnes | G01S 19/45 |
| 2019/0011570 A1* | 1/2019 | Ashjaee | G01S 19/41 |
| 2019/0124618 A1 | 4/2019 | Xiong et al. | |
| 2019/0391276 A1* | 12/2019 | Kroeger | G01S 19/41 |
| 2020/0025937 A1 | 1/2020 | Kroeger et al. | |
| 2023/0254807 A1* | 8/2023 | Tu | H04W 64/003 |
| | | | 455/456.1 |

FOREIGN PATENT DOCUMENTS

| | | |
|---|---|---|
| CN | 105842711 A | 8/2016 |
| CN | 105974453 A | 9/2016 |
| CN | 108353246 A | 7/2018 |
| CN | 108897025 A | 11/2018 |
| CN | 108983263 A | 12/2018 |
| CN | 109085621 A | 12/2018 |
| CN | 109541655 A | 3/2019 |
| CN | 110082804 A | 8/2019 |
| CN | 110673179 A | 1/2020 |
| CN | 110907971 A | 3/2020 |
| JP | H09211099 A | 8/1997 |
| JP | 2001208827 A | 8/2001 |
| WO | 2014132618 A1 | 9/2014 |

OTHER PUBLICATIONS

English translation of the Written Opinion of the International Search Authority in the international application No. PCT/CN2021/085951, mailed on Jun. 25, 2021.

Mei Qi, "Research on Differential Satellite Positioning Technology and System Based on Multiple Base Stations", (China Master's Theses Full-text Database), No. 12, Dec. 31, 2018 (Dec. 31, 2018).

* cited by examiner

BASE STATION DETERMINATION METHOD, APPARATUS AND DEVICE, AND COMPUTER STORAGE MEDIUM

CROSS-REFERENCE TO RELATED APPLICATIONS

This is a National Stage of International Application No. PCT/CN2021/085951 filed on Apr. 8, 2021, which claims priority to Chinese patent application No. 202010819525.3 filed on Aug. 14, 2020. The disclosures of the above-referenced applications are hereby incorporated by reference in their entirety.

TECHNICAL FIELD

The disclosure belongs to the field of positioning, and particularly relates to a method, apparatus and device for determining a base station, and a computer storage medium.

BACKGROUND

From mobile Internet to the Internet of Things, location information is a basic and indispensable information. However, for the demand of refined industry application, only higher-accuracy positioning information can bring higher value. People may know locations of a person and a thing more accurately, so as to provide better services for the person and the thing. Therefore, high-accuracy positioning technology is vital to the applications of the mobile Internet and the Internet of Things, especially to the Internet of Vehicles.

The most common positioning method is satellite positioning, but satellite signals are easily influenced by a sunspot movement, bad weather, electromagnetic interference and other factors, and these influences are unavoidable. In order to offset the interference, a differential positioning technology is commonly adopted in the industry. In order to implement the technology, ground reference stations are deployed nationwide, and the ground reference stations are arranged to receive, process and transmit satellite positioning data to a high-accuracy positioning platform. The high-accuracy positioning platform calculates observation data of each ground reference station, and calculates differential positioning information according to the observation data. When a positioning terminal performs high-accuracy calculation, a rough location information is first obtained by using a satellite positioning signal, then the differential positioning information of the nearest ground reference station is obtained via the high-accuracy positioning platform according to the location information, and an accurate location is calculated using the satellite positioning signal and the differential positioning information.

When the positioning terminal is located at a junction of coverage areas of a plurality of ground reference stations, a non-optimal ground reference station may be selected for the positioning terminal due to a deviation of rough positioning, so that the obtained differential positioning information may not be optimal and the calculated location may have a large error.

SUMMARY

Embodiments of the disclosure provide a method, apparatus and device for determining a base station, and a computer storage medium, which can determine the base station corresponding to optimal differential positioning information and improve a positioning accuracy.

According to a first aspect, the embodiments of the disclosure provide a method for determining a base station. The method includes the following operations.

At least one group of differential positioning information of at least one base station is acquired.

At least one calculation location of a roadside device corresponding to the at least one group of the differential positioning information is calculated according to a received satellite positioning signal and the at least one group of the differential positioning information.

A target base station is determined from the at least one base station according to the at least one calculation location of the roadside device and an actual location of the roadside device. The target base station is a base station that corresponds to a group of the differential positioning information corresponding to a calculation location with a smallest distance from the actual location.

In some embodiments, the operation of acquiring the at least one group of the differential positioning information of the at least one base station may include the following operations.

At least one group of observation data of the at least one base station is acquired.

The at least one group of the differential positioning information is calculated by means of a high-accuracy positioning platform according to the at least one group of the observation data.

In some embodiments, in response to a base station with abnormal network, a group of the differential positioning information corresponding to the base station with abnormal network is deleted from the at least one group of the differential positioning information.

In some embodiments, an average value of a distance between the at least one calculation location and the actual location is calculated.

A first distance between the at least one base station and the roadside device is acquired.

The operation of determining, according to the at least one calculation location of the roadside device and the actual location of the roadside device, the target base station from the at least one base station may include the following operation.

The base station is determined as the target base station according to the distance between the at least one calculation location and the actual location, the average value and the first distance.

In some embodiments, the operation of determining, according to the distance between the at least one calculation location and the actual location, the average value and the first distance, the base station as the target base station may include the following operations.

Normalization processing is performed on the distance between the at least one calculation location and the actual location, the average value and the first distance respectively, to obtain three normalized values.

Weight values corresponding to the three normalized values are determined respectively.

A comprehensive index value is obtained according to the weight values and the three normalized values.

The base station corresponding to a highest comprehensive index value is determined as the target base station.

According to a second aspect, the embodiments of the disclosure provide an apparatus for determining a base station. The apparatus includes: an acquisition component, a calculation component and a determination component.

The acquisition component is configured to acquire at least one group of differential positioning information of at least one base station.

The calculation component is configured to calculate, according to a received satellite positioning signal and the at least one group of the differential positioning information, at least one calculation location of a roadside device corresponding to the at least one group of the differential positioning information.

The determination component is configured to determine, according to the at least one calculation location of the roadside device and an actual location of the roadside device, a target base station from the at least one base station. The target base station is a base station that corresponds to a group of the differential positioning information corresponding to a calculation location with a smallest distance from the actual location.

In some embodiments, the acquisition component is specifically configured to acquire at least one group of observation data of the at least one base station, and calculate the at least one group of the differential positioning information by means of a high-accuracy positioning platform according to the at least one group of the observation data.

In some embodiments, the apparatus may further include a deletion component, configured to delete, in response to a base station with abnormal network, a group of the differential positioning information corresponding to the base station with abnormal network from the at least one group of the differential positioning information.

According to a third aspect, the embodiments of the disclosure provide a device for determining a base station. The device includes: a processor and a memory storing a computer program instruction. The processor is configured to read and execute the computer program instruction to implement the method for determining a base station in the first aspect or any possible implementation of the first aspect.

According to a fourth aspect, the embodiments of the disclosure provide a computer storage medium having stored therein a computer program instruction that, when being executed by a processor, causes the processor to implement the method for determining a base station in the first aspect or any possible implementation of the first aspect.

The embodiments of the disclosure provide the method, apparatus and device for determining a base station, and the computer storage medium. The method includes that: the at least one group of the differential positioning information of the at least one base station is acquired; the at least one calculation location of the roadside device corresponding to the at least one group of the differential positioning information is calculated according to a received satellite positioning signal and the at least one group of the differential positioning information; and the target base station is determined from the at least one base station according to the at least one calculation location of the roadside device and the actual location of the roadside device. The target base station is a base station that corresponds to a group of the differential positioning information corresponding to a calculation location with a smallest distance from the actual location. In this way, the base station corresponding to a group of the differential positioning information corresponding to the calculation location with a smallest distance from the actual location is determined as the optimal ground reference station, the optimal differential positioning information is provided for a terminal device, and the positioning accuracy is improved.

BRIEF DESCRIPTION OF THE DRAWINGS

In order to more clearly explain the technical solutions in the embodiments of the disclosure, the drawings required in the embodiments of the disclosure will be briefly introduced below. Those of ordinary skill in the art may also obtain other drawings in accordance with these drawings without paying creative labor.

DETAILED DESCRIPTION

Figure 1:
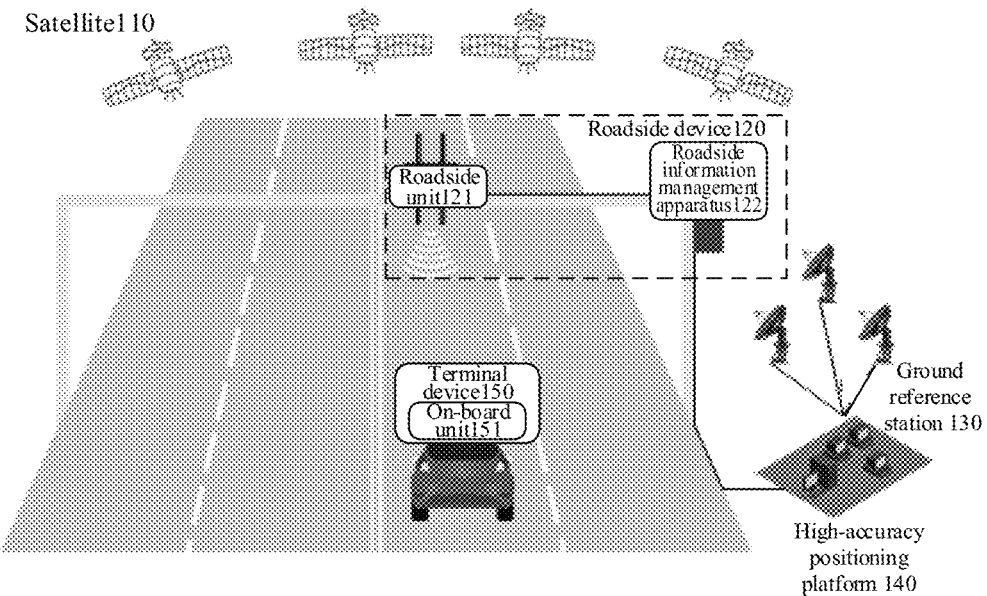
FIG. 1 is a structural schematic diagram of a system for determining a base station according to an embodiment of the disclosure.

Features and exemplary embodiments of various aspects of the disclosure will be described in detail below. To make the objectives, technical solutions, and advantages of the disclosure clearer, the disclosure is described below in detail with reference to the accompanying drawings and specific embodiments. It is to be understood that the specific embodiments described herein are only intended to explain the disclosure rather than limit the disclosure. For those skilled in the art, the disclosure may be implemented without some of these specific details. The following description of the embodiments is merely intended to provide a better understanding of the disclosure by showing examples of the disclosure.

It is to be noted that relational terms such as first and second herein are only used to distinguish one entity or operation from another entity or operation, and do not necessarily require or imply any such actual relationship or sequence between these entities or operations. Moreover, terms "include", "comprise" or any other variant are intended to cover nonexclusive inclusions herein, so that a process, method, article or device including a series of elements not only includes those elements but also includes other elements which are not clearly listed, or further includes elements intrinsic to the process, method, article or device. In the absence of further limitations, an element defined by the statement "including a/an . . . " does not exclude existence of the other identical elements in a process, method, article or device including the element.

At present, the most common positioning method is satellite positioning. The four major satellite positioning systems in the world are Beidou in China, the Global Positioning System (GPS) in the United States, the GLObalnaya NAvigatsionnaya Sputnikovaya Sistema (GLONASS) in Russia and Galileo in the European Union. A working principle of various satellite positioning systems is substantially the same. Taking the GPS as an example, it may be simply understood that the GPS is composed of 24 working satellites, so that more than 4 satellites may be observed anywhere in the world at any time. A distance between a satellite at a known location and a user receiver is measured, and then a specific location of the receiver may be known by integrating the data of multiple satellites. Therefore, a quality of the received satellite signal has a great relationship with a positioning precision. However, the satellite signal is easily affected by sunspot movement, bad weather, electromagnetic interference and other factors, and these influences are unavoidable. In order to offset the interference, the differential positioning technology is commonly used in the industry. In the differential positioning technology, a ground reference station is arranged to measure the current satellite signal, and a differential parameter of the satellite signal is calculated according to a known actual location of the ground reference station and the received satellite signal. The differential parameter includes influences caused by various interference factors. Then the differential parameter is sent to a terminal device by the reference station. The terminal device uses the differential parameter to correct a measurement result, so as to obtain an accurate positioning result. Therefore, in order to achieve high-precision positioning, the positioning device needs to receive differential positioning information.

In a related art, in order to achieve a nationwide high-accuracy positioning, the ground reference stations are deployed nationwide. The ground reference stations are arranged to receive, process and transmit satellite positioning data to a high-accuracy positioning platform, and station spacing between the ground reference stations is usually designed to range from tens of kilometers to hundreds of kilometers. If the spacing is too large, an error between the differential positioning information calculated from the data observed at the ground reference station and the differential positioning information at a positioning terminal may be large, resulting in the reduction of the positioning accuracy. If the spacing is too small, the number of stations may increase sharply, resulting in too high station construction cost. When the terminal device performs high-accuracy positioning calculation, a rough location information is first obtained by using a satellite positioning signal, then the differential positioning information of the nearest ground reference station is obtained via the high-accuracy positioning platform according to the location information, and an accurate location is calculated using the satellite positioning signal and the differential positioning information. The differential positioning information is acquired by the terminal device from the high-accuracy positioning platform through a mobile communication network. That is, the positioning terminal needs to be provided with a mobile communication function and enables a high-accuracy positioning function. As such, the cost of the positioning terminal may be increased. If the ground reference station selected by the terminal device through rough positioning is faulty or the selected ground reference station is seriously disturbed, the differential positioning information calculated from the data observed by the ground reference station cannot be used to calculate the high-accuracy location information.

To solve the problems in the related art, the embodiments of the disclosure provide a method, apparatus and device for determining a base station, and a computer storage medium.

In the embodiments of the disclosure, multiple groups of differential positioning information of multiple ground reference stations in the periphery are acquired through a roadside device; at least one calculation location of the roadside device corresponding to at least one group of differential positioning information is calculated according to a received satellite positioning signal and the acquired at least one group of differential positioning information; the at least one calculation location is compared with an actual location of the roadside device; and a ground reference station corresponding to a group of differential positioning information corresponding to the calculation location nearest to the actual location is selected as the optimal ground reference station, which provides the optimal differential positioning information for the terminal device, and then improves the positioning accuracy. Meanwhile, since the determined ground reference station information is broadcast to the terminal device via the roadside device, it is not necessary for the terminal device to acquire the differential positioning information from the high-accuracy positioning platform through the mobile communication network module, and it is also not necessary to enable the high-accuracy positioning function, thereby reducing the cost of the terminal device.

FIG. 1 shows a structural schematic diagram of a system for determining a base station according to an embodiment of the disclosure.

As shown in FIG. 1, the system for determining a base station may include: a satellite 110, a roadside device 120, a ground reference station 130, a high-accuracy positioning platform 140 and a terminal device 150.

The roadside device 120 includes a roadside unit 121 and a roadside information management apparatus 122. The roadside unit 121 is installed on the roadside, and may communicate with a communication device running on the highway using Dedicated Short Range Communication (DSRC) and/or Long Term Evolution-Vehicle (LTE-V) technology, so as to send and receive various kinds of information. The roadside unit 121 in the embodiment of the disclosure is further configured to broadcast base station information or differential positioning information of the ground reference station 130 suitable for a positioning terminal in this area to the roadside.

An on-board unit 151 is installed in the terminal device 150, and the on-board unit 151 may communicate with the roadside unit 121 using the DSRC and/or LTE-V technology, so as to send and receive various kinds of information. The on-board unit 151 in the embodiment of the disclosure may further be configured to receive the base station information or the differential positioning information of the ground reference station 130 suitable for the terminal device 150 in this area broadcast by the roadside unit 121 to the roadside. The terminal device 150 may be a car, a truck, or some other vehicles with a positioning system, which is not limited herein.

In a satellite positioning system, the satellite 110 transmits a satellite positioning signal, the ground reference station 130 continuously observes the satellite positioning signal for a long time, observation data is transmitted to the high-accuracy positioning platform 140 by the communication device in real time or at a regular time, and the high-accuracy positioning platform 140 calculates the observation data of each ground reference station 130 to obtain at least one piece of differential positioning information from the observation data. The roadside information management apparatus 122 determines the ground reference station 130 corresponding to an optimal group of differential positioning information as the optimal ground reference station 130 according to the satellite positioning signal, at least one group of the differential positioning information acquired from the high-accuracy positioning platform 140 and its own actual location, and sends the base station information of the optimal ground reference station 130 or the optimal group of differential positioning information to the roadside unit 121. The roadside unit 121 forms a broadcast message according to the received base station information of the target base station or the optimal group of differential positioning information, and broadcasts the broadcast message to the roadside terminal device 150. The on-board unit 151 receives the broadcast message, and the terminal device 150 calculates the high-accuracy location information of the terminal device 150 according to the received satellite positioning information and the broadcast message received by the on-board unit 151.

The method for determining a base station provided by the embodiments of the disclosure is introduced below.

Figure 2:
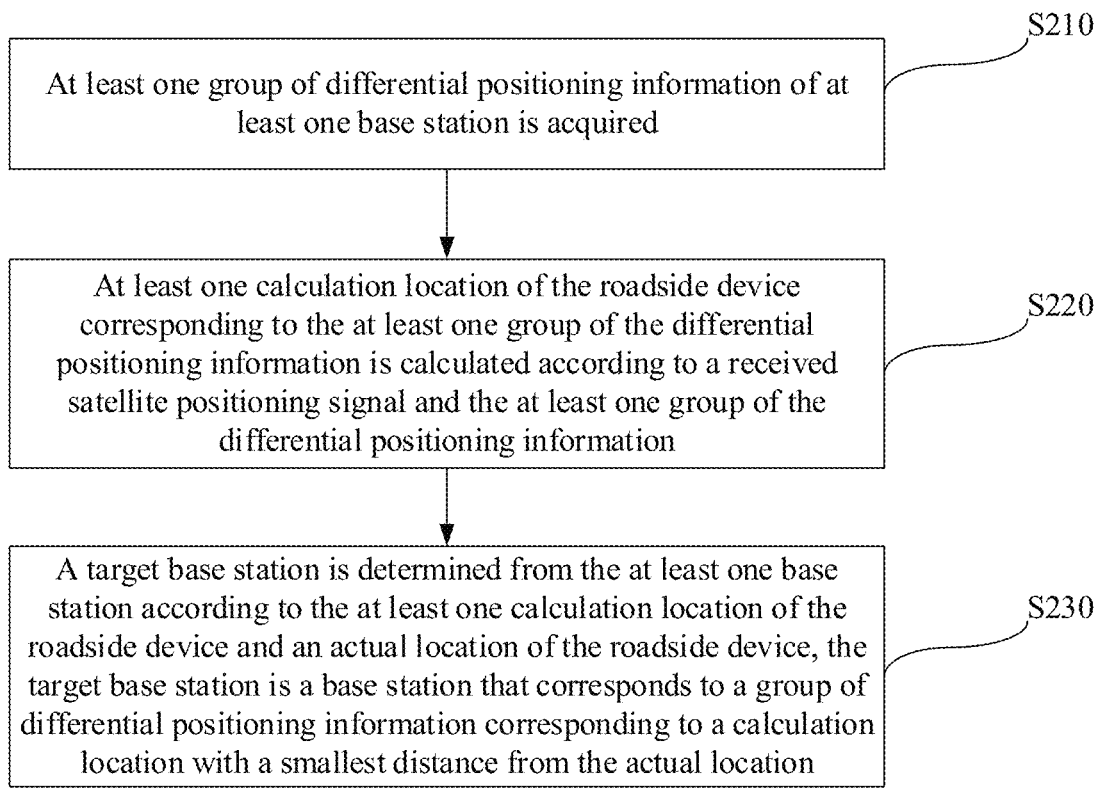
FIG. 2 is a flowchart of a method for determining a base station according to an embodiment of the disclosure.

FIG. 2 shows a flowchart of a method for determining a base station according to an embodiment of the disclosure. As shown in FIG. 2, the method includes the following operations.

At S210, at least one group of differential positioning information of at least one base station is acquired.

The base station, that is, the ground reference station 130, continuously observes the satellite positioning signal for a long time, and transmits the observation data to the high-accuracy positioning platform 140 in real time or at a regular time via a communication device for the calculation of differential positioning data. The ground reference stations 130 are usually continuous in coverage, and the station spacing is between tens of kilometers and hundreds of kilometers.

In order to accurately calculate its own location, the roadside device 120 acquires the at least one group of the differential positioning information of the at least one ground reference station 130 from the high-accuracy positioning platform 140. The at least one group of the differential positioning information at least includes errors such as a clock error between a satellite and a receiver, an atmospheric propagation delay, and a multipath effect.

For the selection manner of the at least one ground reference station 130, at least one ground reference station 130 closest to the roadside device 120 may be selected, or at least one ground reference station 130 within a certain distance around the roadside device 120 may be selected.

At S220, at least one calculation location of the roadside device corresponding to the at least one group of the differential positioning information is calculated according to the received satellite positioning signal and the at least one group of the differential positioning information.

The roadside device 120 receives the satellite positioning signal transmitted by the satellite 110, and acquires positioning information in the satellite positioning signal. The positioning information at least includes coordinates of the satellite 110 and a propagation delay of the satellite positioning signal. The roadside device 120 screens out a rough location according to the positioning information, and corrects the rough location using the differential positioning information to obtain the calculation location. In order to compare an accuracy of the correction to the location of the terminal device 150 by each group of the differential positioning information to determine the optimal group of differential positioning information, the positioning information and the at least one group of the differential positioning information are calculated to obtain the at least one calculation location of the roadside device 120.

At S230, a target base station is determined from the at least one base station according to the at least one calculation location of the roadside device and an actual location of the roadside device. The target base station is a base station corresponding to a group of differential positioning information corresponding to a calculation location with a smallest distance from the actual location.

The roadside device 120 calculates the distance between its own calculation location and the actual location to select the group of differential positioning information corresponding to the calculation location with the smallest distance as the currently optimal group of differential positioning information, and determines the base station corresponding to the group of differential positioning information as the target base station. The target base station is the ground reference station 130 that provides the group of differential positioning information to the terminal device.

Specifically, coordinates of the calculation location of the roadside device 120 are $(x_i, y_i, z_i)$, i representing the i-th group of differential positioning information corresponding to the i-th ground reference station. When the roadside device 120 is deployed, the actual location of the roadside device 120 is recorded and stored. The coordinates of the actual location are (x, y, z), and the distance between the coordinates of the calculation location and the coordinates of the actual location is calculated according to the following formula:

$$d_i = \sqrt{(x_i-x)^2+(y_i-y)^2+(z_i-z)^2} \tag{1}$$

Multiple distances $d_i$ between the coordinates of multiple calculation locations and the coordinates of the actual location are compared, the group of differential positioning information corresponding to a minimum value is determined as the optimal group of differential positioning information, and the base station corresponding to the group of differential positioning information is determined as the target base station.

In an embodiment, by calculating the distance between its own calculation location and the actual location, the roadside device 120 may also select the observation data corresponding to the calculation location with the smallest distance as the currently optimal observation data, and the roadside device 120 determines the ground reference station 130 to acquire the differential positioning information according to the observation data.

In the embodiment of the disclosure, at least one group of the differential positioning information of the at least one ground reference station 130 is acquired; the at least one calculation location of the roadside device 120 corresponding to at least one group of the differential positioning information is calculated according to the received satellite positioning signal and at least one group of the differential positioning information; and the target base station is determined from the at least one ground reference station 130 according to the at least one calculation location of the roadside device 120 and the actual location of the roadside device. The target base station is the ground reference station 130 that corresponds to the group of differential positioning information corresponding to the calculation location with the smallest distance from the actual location. The group of differential positioning information corresponding to the calculation location closest to the actual location is determined as the optimal group of differential positioning information, and the base station corresponding to the group of differential positioning information is determined as the optimal ground reference station 130, which provides the optimal differential positioning information for the terminal device, and improves the positioning accuracy.

In an embodiment, the operation of acquiring the at least one group of the differential positioning information of the at least one base station includes that: at least one group of observation data of the at least one base station is acquired, and the at least one group of the differential positioning information is calculated by the high-accuracy positioning platform according to the at least one group of the observation data. Specifically, the roadside device 120 requests the high-accuracy positioning platform 140 for the observation data of the ground reference station 130 nearby, and a query request contains location information of the roadside device 120. The high-accuracy positioning platform 140 queries, according to the location information, the plurality of ground reference stations 130 near the location, and acquires the observation data of these ground reference stations 130. The high-accuracy positioning platform 140 then calculates the corresponding differential positioning information, thus obtaining the information of the plurality of ground reference stations 130 and a plurality of groups of differential positioning information corresponding to the plurality of ground reference stations.

In an embodiment, when receiving the at least one group of the observation data of the at least one ground reference station 130, the roadside device 120 may detect whether the ground reference station 130 is normal or not. If there is a ground reference station 130 with abnormal network, the group of the differential positioning information corresponding to the ground reference station 130 may be deleted from the acquired at least one group of the differential positioning information, which may effectively reduce some invalid calculations and improve the positioning efficiency.

In an embodiment, the distance between the calculation location and the actual location of the roadside device 120 obtained above is denoted as index 1. An average value of the index 1 is calculated and denoted as index 2, that is, a distance value between the coordinates of the calculation location and the coordinates of the actual location calculated according to data measured in a last preset time period or an average distance value between the coordinates of the calculation location and the coordinates of the actual location in the last N preset time periods. The distance between the actual location of the ground reference station 130 and the actual location of the roadside device 120 is acquired and denoted as index 3. A comprehensive index value is calculated according to one or more of index 1, index 2 and index 3. The ground reference station 130 with the highest comprehensive index value is determined as currently the optimal ground reference station 130, and the observation data of the ground reference station 130 is selected as basic data for calculating the differential positioning information.

Specifically, the above three kinds of indexes are calculated according to the calculation location and the actual location of the roadside device 120 and the actual location of the ground reference station 130. Assuming that there are n ground reference stations 130, n values for each kind of index may be obtained. Then values of each kind of index are subjected to normalization, and the normalized values of the three kinds of indexes are $D_{1i}$, $D_{2i}$ and $D_{3i}$ respectively, where i is a natural number between 1 and n. The comprehensive index value is calculated by the following formula:

$$P_i = D_{1i}*w_1 + D_{2i}*w_2 + D_{3i}*w_3 \quad (2)$$

In formula (2), $w_1$, $w_2$ and $w_3$ are weight values for the three kinds of indexes, respectively. The weight values for the three kinds of indexes are determined according to actual advantages and disadvantages of each kind of index, the comprehensive index value $P_i$ is calculated according to the above formula (2), and the ground reference station 130 corresponding to the highest comprehensive index value $P_i$ is determined as the optimal ground reference station 130. When a kind of index is not considered, the weight of the kind of index is 0. For example, in the above method for determining a base station, only the distance between the calculation location and the actual location of the roadside device 120 is used as the basis for determination, so $w_1=1$, $w_2=0$, $w_3=0$. After multiple experiments, a typical weight values are measured as $w_1=0.5$, $w_2=0.25$ and $w_3=0.25$, which enables the positioning result of the terminal device 150 to be more accurate. In addition to the weight values listed above, the weight values may also be flexibly adjusted according to an actual situation, which is not limited here. In order to reduce the amount of calculation, when the weight of a kind of index is 0, the kind of index may not be calculated. In the embodiment of the disclosure, the distance between the calculation location and the actual location of the roadside device 120, the average value of the distance between the calculation location and the actual location of the roadside device 120, and the distance between the actual location of the ground reference station 130 and the actual location of the roadside device 120 are used as a comprehensive determination basis, which may improve the accuracy in determining the base station.

Figure 3:
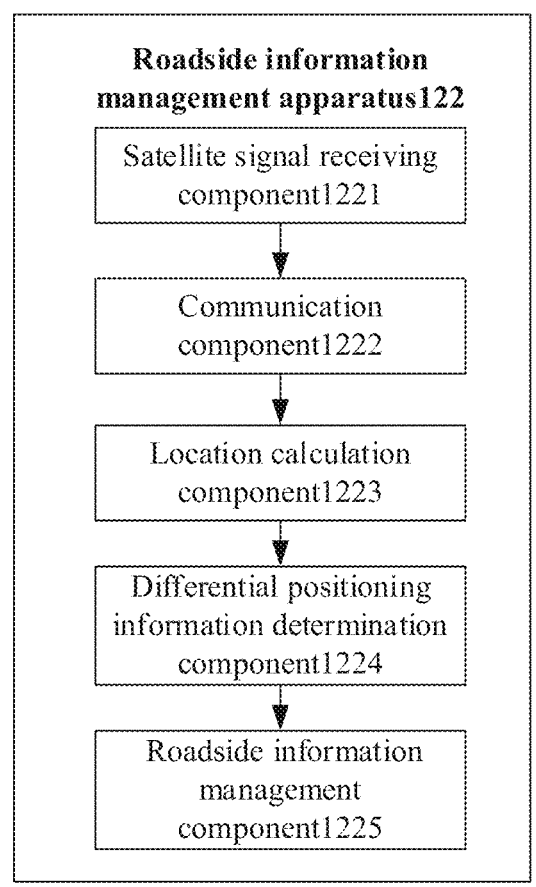
FIG. 3 is a structural schematic diagram of a roadside information management apparatus according to an embodiment of the disclosure.

In an embodiment, FIG. 3 is a structural schematic diagram of a roadside information management apparatus according to an embodiment of the disclosure. As shown in FIG. 3, the roadside information management apparatus 122 includes: a satellite signal receiving component 1221, a communication component 1222, a location calculation component 1223, a differential positioning information determination component 1224 and a roadside information management component 1225.

The roadside information management apparatus 122 is configured to receive the satellite positioning signal through the satellite signal receiving component 1221, to acquire positioning information in the satellite positioning signal. The communication component 1222 is configured to acquire at least one group of differential positioning information of at least one ground reference station 130 from a high-accuracy positioning platform 140. The location calculation component 1223 is configured to calculate at least one calculation location of the roadside devices 120 according to the positioning information and the at least one group of the differential positioning information. The differential positioning information determination component 1224 is configured to determine, according to the at least one calculation location and an actual location of the roadside device 120, a group of differential positioning information or base station information corresponding to a calculation location with a smallest distance from the actual location as an optimal group of differential positioning information or base station information, and determine the ground reference station 130 corresponding to the group of the differential positioning information as a target base station. The roadside information management component 1225 is configured to send control information to the roadside unit 121 according to a determination result from the differential positioning information determination component 1224. That is, the base station information of the ground reference station 130 or the group of the differential positioning information corresponding to the ground reference station 130 determined by the differential positioning information determination component 1224 is sent to the roadside unit 121, and the roadside unit 121 is controlled to broadcast the base station information or the group of the differential positioning information to the roadside. Herein, the base station information includes the observation data, identification information and the like of the ground reference station 130. If the message broadcast by the roadside unit 121 to the roadside includes the differential positioning information, the roadside information management component 1225 is configured to store the differential positioning information received from the high-accuracy positioning platform 140. If the roadside unit 121 only needs to broadcast the base station information of the determined ground reference station 130 to the roadside terminal device 150, the roadside information management component 1225 does not need to send the differential positioning information to the roadside unit 121. If the roadside unit 121 needs to broadcast the differential positioning information to the roadside terminal device 150, the roadside information management component 1225 is configured to send the differential positioning information to the roadside unit 121.

The roadside unit 121 is configured to form a broadcast message according to the control information and broadcast the broadcast message to the roadside. If the roadside unit 121 only needs to broadcast the base station information of the determined ground reference station 130, the broadcast message only includes identification information of the ground reference station 130. If the roadside unit 121 needs to broadcast the differential positioning information, the broadcast message includes the differential positioning information. The differential positioning information broadcast by the roadside unit 121 may be acquired from the high-accuracy positioning platform 140 or the ground reference station 130 or a virtual reference station.

The terminal device 150 is configured to calculate the positioning result according to the satellite positioning signal received from the satellite 110 and the broadcast message received by the on-board unit 151 from the roadside unit 121. If the broadcast message only contains the identification information of the ground reference station 130, the terminal device 150 acquires the differential positioning information corresponding to the ground reference station 130 from the high-accuracy positioning platform 140 according to the identification information. If the broadcast message already contains the differential positioning information, the terminal device 150 acquires the differential positioning information directly, and then calculates the positioning result according to the satellite positioning signal and the differential positioning information.

The function of the roadside information management apparatus 122 may be implemented by a single apparatus as shown in FIG. 3, or other components except the satellite signal receiving component 1221 may also be integrated in the roadside unit 121 or the on-board unit 151 or the high-accuracy positioning platform 140. If the roadside information management apparatus is arranged on the roadside as a single apparatus or integrated in the roadside unit 121 or the on-board unit 151, the cost of the device may be increased, but the time delay in acquiring the differential positioning information by the on-board unit 151 may be reduced. If the roadside information management apparatus is integrated in the high-accuracy positioning platform 140, the cost of the roadside or vehicle-side device may be reduced, but the time delay in acquiring the differential positioning information by the on-board unit 151 may be increased. Technicians may choose an appropriate way to implement the function of the apparatus according to the requirements for the cost of the device and time delay.

Figure 4:
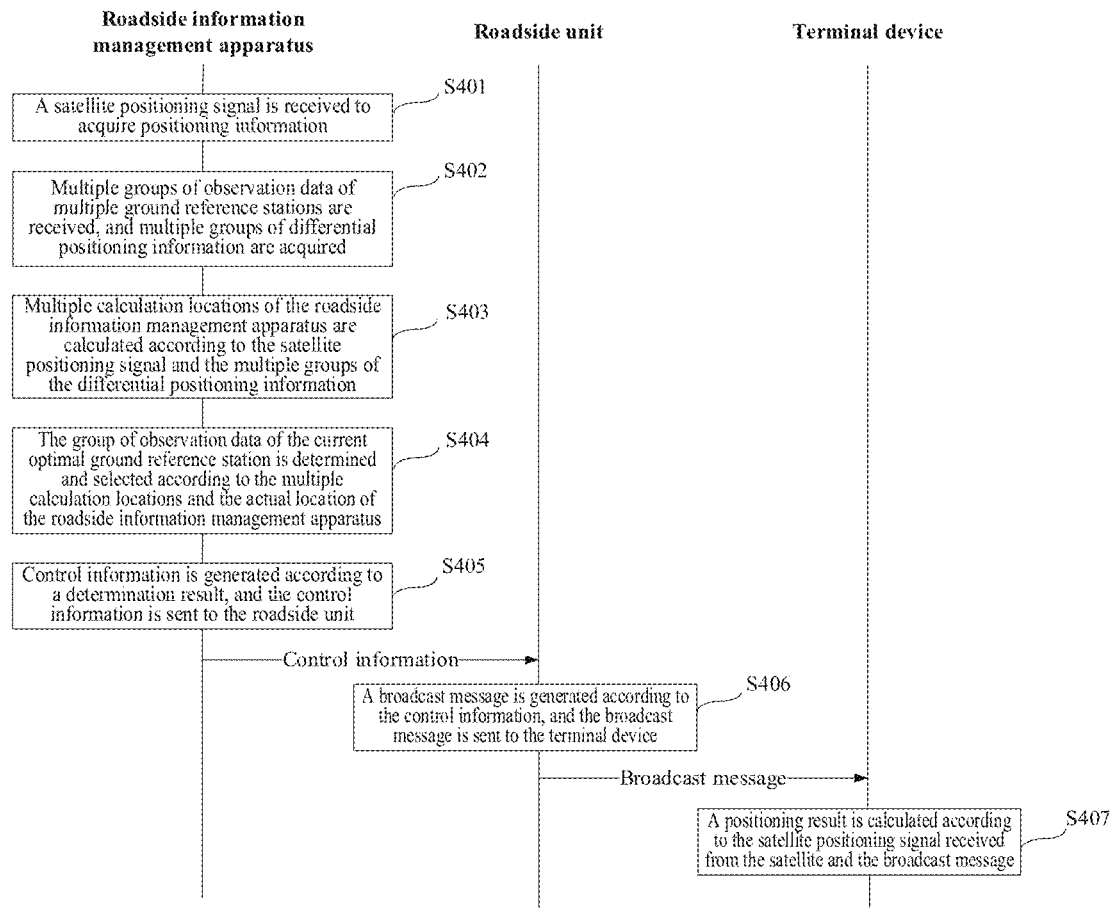
FIG. 4 is a flowchart of a method for determining a base station according to an embodiment of the disclosure.

In an embodiment, FIG. 4 is a flowchart of a method for determining a base station according to an embodiment of the disclosure. As shown in FIG. 4, based on the system architecture, the method for determining a base station includes the following operations.

At S401, a roadside information management apparatus receives a satellite positioning signal to acquire positioning information.

The positioning information at least includes coordinates of a satellite and a propagation delay of the satellite positioning signal.

At S402, multiple groups of observation data of multiple ground reference stations are received, and multiple groups of differential positioning information are acquired.

Specifically, the roadside information management apparatus queries the high-accuracy positioning platform for the observation data of the ground reference station nearby, and a query request includes location information of the roadside information management apparatus. The high-accuracy positioning platform queries, according to the location information, the multiple ground reference stations near the location, and acquires the multiple groups of the observation data of these ground reference stations. The high-accuracy positioning platform then calculates the corresponding differential positioning information. Thus, the information of the multiple ground reference stations and the multiple groups of the differential positioning information corresponding to the multiple ground reference stations are obtained.

For the selection manner of the multiple ground reference stations, multiple ground reference stations closest to the roadside information management apparatus may be selected, or multiple ground reference stations within a certain distance around the roadside information management apparatus may be selected.

The group of differential positioning information at least includes errors such as a clock error between the satellite and a receiver, an atmospheric propagation delay and a multipath effect.

At S403, multiple calculation locations of the roadside information management apparatus are calculated according to the satellite positioning signal and the multiple groups of the differential positioning information.

At S404, the group of observation data of the current optimal ground reference station is determined and selected according to the multiple calculation locations and the actual location of the roadside information management apparatus.

Herein, the group of observation data of the optimal ground reference station is selected as a group of observation data of a ground reference station corresponding to a calculation location closest to the actual location of the roadside information management apparatus.

At S405, control information is generated according to a determination result, and the control information is sent to the roadside unit.

The determination result is the selected group of observation data of the optimal ground reference station or a group of differential positioning information corresponding to the ground reference station. If the roadside unit only needs to send information of the selected ground reference station to the roadside terminal device, the control information does not contain the differential positioning information. If the roadside unit needs to send the selected group of differential positioning information to the roadside terminal device, the control information contains the group of differential positioning information.

At S406, a broadcast message is generated according to the control information, and the broadcast message is sent to the terminal device.

When the roadside unit only needs to send the information of the selected ground reference station, the control information does not contain the differential positioning information. The broadcast message only contains the identification information of the selected ground reference station, and the roadside unit sends the identification information to the terminal device. When the roadside unit needs to send the group of the differential positioning information, the control information contains the group of the differential positioning information, the broadcast message only contains the group of the differential positioning information, and the roadside unit sends the group of the differential positioning information to the terminal device. The group of the differential positioning information may be acquired from the high-accuracy positioning platform or the ground reference station or a virtual reference station.

At S407, a positioning result is calculated according to the satellite positioning signal received from the satellite and the broadcast message.

If the broadcast message only contains the identification information of the selected ground reference station, the terminal device acquires the group of the differential positioning information corresponding to the ground reference station from the high-accuracy positioning platform according to the identification information. If the broadcast message only contains the group of the differential positioning information, the group of the differential positioning information is directly acquired, and then the positioning result is calculated by the terminal device according to the satellite positioning signal and the group of the differential positioning information.

In the embodiment of the disclosure, multiple groups of differential positioning information of multiple ground reference stations in the periphery are acquired through the roadside device. A respective calculation location of the roadside device corresponding to each group of the differential positioning information is calculated according to the received satellite positioning signal and the acquired multiple groups of differential positioning information. Each calculation location is compared with the actual location of the roadside device. A ground reference station corresponding to a group of the differential positioning information corresponding to a calculation location with a smallest distance from the actual location is selected as an optimal high-accuracy positioning reference station here, which provides the optimal differential positioning information for the positioning terminal, avoids using the incorrect differential positioning information when the ground reference station is faulty or the ground reference station is disturbed greatly, and improves the positioning accuracy. Since the roadside unit in the roadside device and the on-board unit in the terminal device may transmit the differential positioning information, there is no need to establish a communication connection between the terminal device and the high-accuracy positioning platform, that is, there is no need for a mobile communication module and enabling the high-accuracy positioning function, thus reducing the cost of the device. The embodiments of the disclosure are suitable for high-precision satellite positioning requirements in a vehicle infrastructure cooperative scenario including but not limited to expressways and urban highways.

Figure 5:
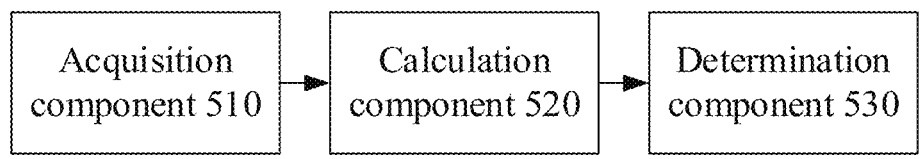
FIG. 5 is a structural schematic diagram of an apparatus for determining a base station according to an embodiment of the disclosure.

FIG. 5 is a structural schematic diagram of an apparatus for determining a base station according to an embodiment of the disclosure. As shown in FIG. 5, the apparatus includes an acquisition component 510, a calculation component 520 and a determination component 530.

The acquisition component 510 is configured to acquire at least one group of differential positioning information of at least one base station.

The calculation component 520 is configured to calculate, according to a received satellite positioning signal and the at least one group of the differential positioning information, at least one calculation location of the roadside device corresponding to the at least one group of the differential positioning information.

The determination component 530 is configured to determine, according to the at least one calculation location of the roadside device and an actual location of the roadside device, a target base station from the at least one base station. The target base station is a base station that corresponds to a group of differential positioning information corresponding to a calculation location with a smallest distance from the actual location.

In an embodiment, the acquisition component 510 is specifically configured to acquire at least one group of observation data of the at least one base station, and calculate the at least one group of the differential positioning information through a high-accuracy positioning platform according to the at least one group of the observation data.

In an embodiment, the apparatus further includes a deletion component, configured to delete, in response to a base station with abnormal network, a group of the differential positioning information corresponding to the base station with abnormal network from the at least one group of the differential positioning information.

In an embodiment, the calculation component 520 is further configured to calculate an average value of a distance between the at least one calculation location and the actual location. The acquisition component 510 is further configured to acquire a first distance between the at least one base station and the roadside device. The determination component 530 is further configured to determine, according to the distance between the at least one calculation location and the actual location, the average value and the first distance, a target base station.

In an embodiment, the determination component 530 is specifically configured to perform normalization processing on the distance between the at least one calculation location and the actual location, the average value and the first distance respectively, to obtain three normalized values; determine weight values corresponding to the three normalized values, respectively; obtain, according to the weight values and the three normalized values, a comprehensive index value; and determine a base station corresponding to the highest comprehensive index value as the target base station.

Each component in the apparatus shown in FIG. 5 may be configured to implement each step in FIG. 2, and can achieve the corresponding technical effect, which is not repeated herein for briefness of description.

Figure 6:
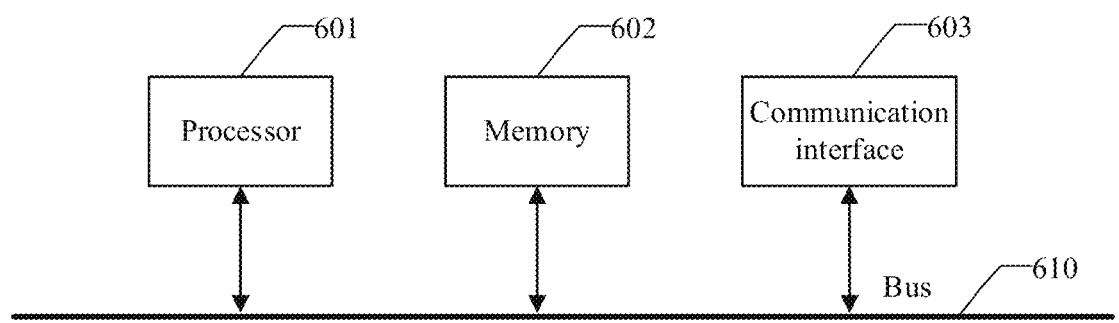
FIG. 6 is a structural schematic diagram of a device for determining a base station according to an embodiment of the disclosure.

FIG. 6 shows a structural schematic diagram of a device for determining a base station according to an embodiment of the disclosure.

As shown in FIG. 6, the device for determining a base station may include a processor 601 and a memory 602 storing a computer program instruction.

Specifically, the processor 601 may include a Central Processing Unit (CPU), an Application Specific Integrated Circuit (ASIC), or one or more integrated circuits that may be configured to implement the embodiments of the disclosure.

The memory 602 may include a high-capacity memory for storing data or instructions. Exemplarily rather than restrictively, the memory 602 may include a Hard Disk Drive (HDD), a floppy disk drive, a flash memory, an optical disk, a magneto-optical disk, a tape, a Universal Serial Bus (USB) drive, or a combination of two or more of the above memories. In an example, the memory 602 may include a removable or non-removable (or fixed) medium, or the memory 602 is a nonvolatile solid-state memory. The memory 602 may be arranged inside or outside a disaster recovery device of an integrated gateway.

In an example, the memory 602 may include a Read-Only Memory (ROM), a Random Access Memory (RAM), a magnetic disk storage media device, an optical storage media device, a flash memory device, and electrical, optical or other physical/tangible storage devices. Therefore, generally, the memory 602 includes one or more tangible (non-transitory) computer-readable storage media (e.g., a memory device) encoded with software including a computer-executable instruction, and when the software is executed (e.g., by one or more processors), it is operable to execute the operations described with reference to the method according to an aspect of the disclosure.

The processor 601 is configured to read and execute the computer program instruction stored in the memory 602 to implement operations S210-S230 in the embodiment shown in FIG. 2, and achieve the corresponding technical effect achieved by executing the steps in the example shown in FIG. 2, which is not repeated here for briefness of description.

In an example, the device for determining a base station may further include a communication interface 603 and a bus 610. As shown in FIG. 6, the processor 601, the memory 602, and the communication interface 603 are connected and communicate with one another through the bus 610.

The communication interface 603 is mainly configured to implement communications between components, apparatuses, units, and/or devices in the embodiments of the disclosure.

The bus 610 includes hardware, software, or both, and is configured to couple components of the device. Exemplarily rather than restrictively, the bus may include an Accelerated Graphics Port (AGP) or other graphics bus, an Extended Industry Standard Architecture (EISA) bus, a Front Side Bus (FSB), a Hyper Transport (HT) interconnect, an Industry Standard Architecture (ISA) bus, an infinite bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association (VESA) Local Bus (VLB) or other suitable bus, or a combination of two or more of the above. If appropriate, the bus 610 may include one or more buses. Although a specific bus is described and shown in the embodiment of the disclosure, any suitable bus or interconnect is considered in the disclosure.

The device for determining a base station may execute the method for determining a base station in the embodiments of the disclosure based on the at least one calculation location of the roadside device calculated according to the satellite signal and at least one group of the differential positioning information and the actual location of the roadside device, thereby implementing the method and apparatus for determining a base station described in conjunction with FIGS. 1, 2, 3, 4 and 5.

In addition, in combination with the method for determining a base station in the above embodiment, an embodiment of the disclosure provides a computer storage medium for implementation. A computer program instruction is stored on the computer storage medium. When executed by a processor, the computer program instruction causes the processor to implement any method for determining a base station in the above-mentioned embodiments.

It is to be noted that the disclosure is not limited to specific configurations and processing described above and shown in the figures. For brevity, detailed descriptions about known methods are omitted herein. A plurality of specific steps are described and shown in the above-mentioned embodiments as examples. However, the method in the disclosure is not limited to the described and shown specific steps, and those skilled in the art may make various variations, modifications, and additions or change a sequence of the steps after understanding the spirit of the disclosure.

The function block shown in the structure block diagram may be implemented in hardware, software, firmware, or a combination thereof. When being implemented in hardware, the function block may be, for example, an electronic circuit, an Application Specific Integrated Circuit (ASIC), and suitable firmware, plug-in, and functional card. When being implemented in software, the element of the disclosure is a program or code segment for executing a required task. The program or code segment may be stored in a machine-readable medium, or transmitted on a transmission medium or communication link by a data signal contained in a carrier. The "machine-readable medium" may include any medium capable of storing or transmitting information. Examples of the machine-readable medium include an electronic circuit, a semiconductor memory device, a ROM, a flash memory, an Erasable ROM (EROM), a floppy disk, a Compact Disc ROM (CD-ROM), an optical disk, a hard disk, an optical fiber medium, a Radio Frequency (RF) link, etc. The code segment may be downloaded through a computer network, such as the Internet and an intranet.

It is also to be noted that some methods or systems are described in the exemplary embodiments mentioned in the disclosure based on a series of steps or components. However, the disclosure is not limited to the sequence of the steps. That is, the steps may be executed according to the sequence mentioned in the embodiments or a sequence different from that in the embodiments, or a plurality of steps may be executed simultaneously.

Aspects of the disclosure are described above with reference to flowcharts and/or block diagrams of the method, apparatus (system) and computer program product according to the embodiments of the disclosure. It is to be understood that each block in the flowcharts and/or the block diagrams and a combination of blocks in the flowcharts and/or the block diagrams may be implemented by computer program instructions. These computer program instructions may be provided to the processor of a general-purpose computer, a special-purpose computer, or other programmable data processing apparatus to produce a machine, so that the instructions executed via the processor of the computer or other programmable data processing apparatus enable the implementation of the functions/actions specified in one or more blocks of the flowchart and/or block diagram. The processor may be, but is not limited to, a general-purpose processor, a special-purpose processor, a special-application processor, or a field programmable logic circuit. It is also to be understood that each block in the block diagram and/or flowchart, and a combination of blocks in the block diagram and/or flowchart, may also be implemented by special-purpose hardware that executes specified functions or actions, or may be implemented by a combination of special-purpose hardware and computer instructions.

The above is only the specific implementations of the disclosure. Those skilled in the art may clearly learn about that specific working processes of the system, module, and unit described above may refer to the corresponding processes in the method embodiment and will not be elaborated herein for ease and briefness of description. It is to be understood that the scope of protection of the disclosure is not limited thereto. Any equivalent modifications or replacements apparent to those skilled in the art within the technical scope disclosed by the disclosure shall fall within the scope of protection of the disclosure.

What is claimed is:

1. A method for determining a reference station, comprising:
 acquiring at least one group of differential positioning information of at least one reference station;
 calculating, according to a received satellite positioning signal and the at least one group of the differential positioning information, at least one calculation location of a roadside device corresponding to the at least one group of the differential positioning information; and
 determining, according to the at least one calculation location of the roadside device and an actual location of the roadside device, a target reference station from the at least one reference station, wherein the target reference station is a reference station that corresponds to a group of the differential positioning information corresponding to a calculation location with a smallest distance from the actual location.

2. The method of claim 1, wherein acquiring the at least one group of the differential positioning information of the at least one reference station comprises:
 acquiring at least one group of observation data of the at least one reference station; and
 calculating the at least one group of the differential positioning information by means of a high-accuracy positioning platform according to the at least one group of the observation data.

3. The method of claim 1, further comprising:
 in response to a reference station with abnormal network, deleting a group of the differential positioning information corresponding to the reference station with abnormal network from the at least one group of the differential positioning information.

4. The method of claim 1, further comprising:
 calculating an average value of a distance between the at least one calculation location and the actual location; and
 acquiring a first distance between the at least one reference station and the roadside device,
 wherein determining, according to the at least one calculation location of the roadside device and the actual location of the roadside device, the target reference station from the at least one reference station comprises:
 determining, according to the distance between the at least one calculation location and the actual location, the average value and the first distance, the reference station as the target-base station reference station.

5. The method of claim 4, wherein determining, according to the distance between the at least one calculation location and the actual location, the average value and the first distance, the reference station as the target reference station comprises:
 performing normalization processing on the distance between the at least one calculation location and the actual location, the average value and the first distance respectively, to obtain three normalized values;
 determining weight values corresponding to the three normalized values, respectively;
 obtaining, according to the weight values and the three normalized values, a comprehensive index value; and
 determining the reference station corresponding to a highest comprehensive index value as the target reference station.

6. An apparatus for determining a reference station, comprising:
 a processor;
 a memory for storing a computer program instruction executable by the processor; and
 a communication interface;
 wherein the processor is configured to execute the computer program instruction to:
 control the communication interface to acquire at least one group of differential positioning information of at least one reference station;
 calculate, according to a received satellite positioning signal and the at least one group of the differential positioning information, at least one calculation location of a roadside device corresponding to the at least one group of the differential positioning information; and
 determine, according to the at least one calculation location of the roadside device and an actual location of the roadside device, a target reference station from the at least one reference station, wherein the target reference station is a reference station that corresponds to a group of the differential positioning information corresponding to a calculation location with a smallest distance from the actual location.

7. The apparatus of claim 6, wherein the processor is further configured to:
 control the communication interface to acquire at least one group of observation data of the at least one reference station; and
 calculate the at least one group of the differential positioning information by means of a high-accuracy positioning platform according to the at least one group of the observation data.

8. The apparatus of claim 6, wherein the processor is further configured to: delete, in response to a reference station with abnormal network, a group of the differential positioning information corresponding to the reference station with abnormal network from the at least one group of the differential positioning information.

9. A non-transitory computer storage medium having stored therein a computer program instruction that, when being executed by a processor, causes the processor to implement operations comprising:
 acquiring at least one group of differential positioning information of at least one reference station;
 calculating, according to a received satellite positioning signal and the at least one group of the differential positioning information, at least one calculation location of a roadside device corresponding to the at least one group of the differential positioning information; and
 determining, according to the at least one calculation location of the roadside device and an actual location of the roadside device, a target reference station from the at least one reference station, wherein the target reference station is a reference station that corresponds to a group of the differential positioning information corresponding to a calculation location with a smallest distance from the actual location.

10. The non-transitory computer storage medium of claim 9, wherein acquiring the at least one group of the differential positioning information of the at least one reference station comprises:

acquiring at least one group of observation data of the at least one reference station; and calculating the at least one group of the differential positioning information by means of a high-accuracy positioning platform according to the at least one group of the observation data.

11. The non-transitory computer storage medium of claim 9, wherein the operations further comprise:

in response to a reference station with abnormal network, deleting a group of the differential positioning information corresponding to the reference station with abnormal network from the at least one group of the differential positioning information.

12. The non-transitory computer storage medium of claim 9, wherein the operations further comprise:

calculating an average value of a distance between the at least one calculation location and the actual location; and acquiring a first distance between the at least one reference station and the roadside device, wherein determining, according to the at least one calculation location of the roadside device and the actual location of the roadside device, the target reference station from the at least one reference station comprises:

determining, according to the distance between the at least one calculation location and the actual location, the average value and the first distance, the reference station as the target reference station.

13. The non-transitory computer storage medium of claim 12, wherein determining, according to the distance between the at least one calculation location and the actual location, the average value and the first distance, the reference station as the target reference station comprises:

performing normalization processing on the distance between the at least one calculation location and the actual location, the average value and the first distance respectively, to obtain three normalized values;

determining weight values corresponding to the three normalized values, respectively;

obtaining, according to the weight values and the three normalized values, a comprehensive index value; and determining the reference station corresponding to a highest comprehensive index value as the target reference station.

14. The apparatus of claim 6, wherein the processor is further configured to:

calculate an average value of a distance between the at least one calculation location and the actual location;

acquire a first distance between the at least one reference station and the roadside device; and determine, according to the distance between the at least one calculation location and the actual location, the average value and the first distance, the reference station as the target reference station.

15. The apparatus of claim 14, wherein the processor is further configured to:

perform normalization processing on the distance between the at least one calculation location and the actual location, the average value and the first distance respectively, to obtain three normalized values;

determine weight values corresponding to the three normalized values, respectively;

obtain, according to the weight values and the three normalized values, a comprehensive index value; and determine the reference station corresponding to a highest comprehensive index value as the target reference station.

* * * * *